UNITED STATES PATENT OFFICE.

ANDREW LEWIS DEAN, OF QUEENSTOWN, TASMANIA, AUSTRALIA, ASSIGNOR TO THE MOUNT LYELL MINING AND RAILWAY COMPANY LIMITED, OF MELBOURNE, AUSTRALIA.

TREATMENT OF ORES.

No. 914,391.  Specification of Letters Patent.  Patented March 9, 1909.

Application filed July 3, 1907. Serial No. 381,983.

*To all whom it may concern:*

Be it known that I, ANDREW LEWIS DEAN, a subject of the King of Great Britain and Ireland, residing at Queenstown, in the State of Tasmania, Commonwealth of Australia, metallurgist, have invented new and useful Improvements in the Treatment of Ores, of which the following is a specification.

The substances to which my process applies are natural mineral sulfids (or arsenids) or ores, and metallurgical products, which are to hand in a more or less finely divided or pulverulent state, or in small particles, such as ore-fines from mining, concentrates from wet or dry concentration processes, flue-dust and other fine grained powdery products from smelting, etc., and which it is impossible or unpractical or inconvenient to subject to further metallurgical treatment in that physical or mechanical condition.

The invention consists in the utilization of the calorific values inherent in such natural sulfid (or arsenid) ores, or metallurgical products containing more or less sulfids (or arsenids) with the object of changing their physical condition from that of the objectionable fine state of division into a compact mass or masses, without, at the same time, sensibly changing their chemical composition. The product resulting from the process is specially intended not to possess or show a greater state of oxidation of any of its contents than is suitable for its subsequent metallurgical treatment in any manner requiring the presence of a practically undiminished proportion of sulfids (or arsenids) for its success, such as matte smelting, pyritic or pyrite smelting, etc. The utilization of the heat values is effected by the combustion of a portion of the natural fuels contained in the substances to an extent just sufficient to cause a partial or semi-fusion of some of the constituents, so that the result will be an agglomerated mass, or clinker.

It is necessary that the charge or mixture should, to begin with, contain sufficient natural or artificial sulfids (or arsenids) of the metals to allow of incipient fusion or agglomeration at a low heat. If not present, such fusible mineral or chemical substances (like pyrites, matte, etc.) will have to be added as will cause the charge or mixture to ignite easily and to continuously support the extent of combustion required, and to produce the desired agglomerating or fritting effect.

The agglomerated or clinkered mass will consist principally of sulfids of the metals involved, or of silicates of same, but preferably the former, accompanied by a subordinate proportion of oxids and sulfates of the metals.

The operation may be conducted in any vessel of a shape and size suitable for the purpose, and from which the agglomerated contents may be subsequently discharged in a simple manner, and into which atmospheric air (with or without steam) may be admitted, either under natural or artificial draft or blast, and with the requisite low degree of pressure, also in sufficient quantity, and in such a manner that the air is evenly distributed throughout the mass and will penetrate same equally, so as to maintain a sufficiently thorough and rapid combustion of the sulfids (or arsenids) to an extent adequate for producing the heat necessary to effect the agglomeration or fritting of the charge.

The manipulation is similar to that in use at the present time in what is called "pot-roasting," but with this distinct difference, that in my invention roasting or calcining and or complete slagging are not the intention and oxidation is only carried as far as it is unavoidable for the development, out of the natural fuels in the charge, of the modicum of heat required to agglomerate its constituents. A further elimination of sulfur than accompanies this action, or a thorough oxidation, with or without slagging, is not intended, the final object being not a chemical, but merely a mechanical or physical alteration of the substances treated, as a preparation for more effective subsequent treatment, such as in blast furnaces.

The operation is conveniently carried out in a pot-shaped or conical vessel of cast iron. The bottom of the vessel is fitted with an opening to which a blast pipe may be attached from the outside. The inner bottom portion of the vessel is covered by means of a perforated metal plate, forming a false bottom, which serves to distribute the blast uniformly throughout the charge.

The method of operation consists in igniting a small quantity of kindling or small wood, or other carbonaceous fuel, on top of the perforated false bottom, then turning on a gentle (air or steam) blast until the kindling has become thoroughly ignited and the fire is distributed as evenly as possible over the bottom of the pot. Thereupon, the prepared mixture, or charge, is then added gradually, in small portions at a time, until the kindling is completely covered to a depth of several inches. The mixture of substances ignites at once, and subsequent additions of same are so regulated, that the fire which breaks through the mass towards the surface is forced to burn as uniformly as possible throughout the mass. As soon as this becomes apparent the pot or vessel is filled up rapidly with the balance of the charge, the additions being so regulated with the use of simple tools that any irregular breaking through of the fire is prevented, in order that an even fritting or clinkering may proceed throughout the mass. The fritting or agglomerating action starts at the place of ignition and proceeds upward throughout the charge as regularly as possible, binding its constituents together. Whenever the fire fully reaches the surface of the charge and appears to have penetrated the mass uniformly, the blast is turned off and the contents of the vessel may be discharged and cooled. They will be found well fritted together into one lump and to be altered into a massive yet porous condition, without special chemical change of composition.

It is serviceable to have all of the materials used small or fine enough to pass through a screen with quarter inch holes, and they should be thoroughly mixed before charging into the vessel. The original chemical composition of the mixture will depend either upon its derivation or upon considerations governing its proposed subsequent treatment after agglomeration. Aside from these connections the chemical composition can vary within the widest possible limits, the main point involved in a chemical respect, with regard to the behavior in the vessel, being, that the mixture shall be, as a whole, sufficiently easily fusible to allow the agglomeration to take place.

Having now described my invention what I claim as new and desire to secure by Letters Patent is:—

The method of preparing fines of natural mineral sulfids, or arsenids, for metallurgical treatment in a blast furnace, which consists in screening the fines and thoroughly mixing them, then charging a portion thereof over some carbonaceous fuel which has become thoroughly ignited in a suitable furnace, then after said charging portion has become thoroughly ignited, charging in the remainder of the fines, and continuing combustion, until the fire has penetrated the mass uniformly, the resultant mass being then removed from the furnace, and broken up to suitable sizes for further treatment in a blast furnace.

In testimony whereof I have signed my name to this specification in the presence of two subscribing witnesses.

ANDREW LEWIS DEAN.

Witnesses:
  C. EATON. BROWN,
  V. ALOMES.